Dec. 13, 1960    C. G. WIPPLER    2,964,640
TURBIDIMETER
Filed April 24, 1958
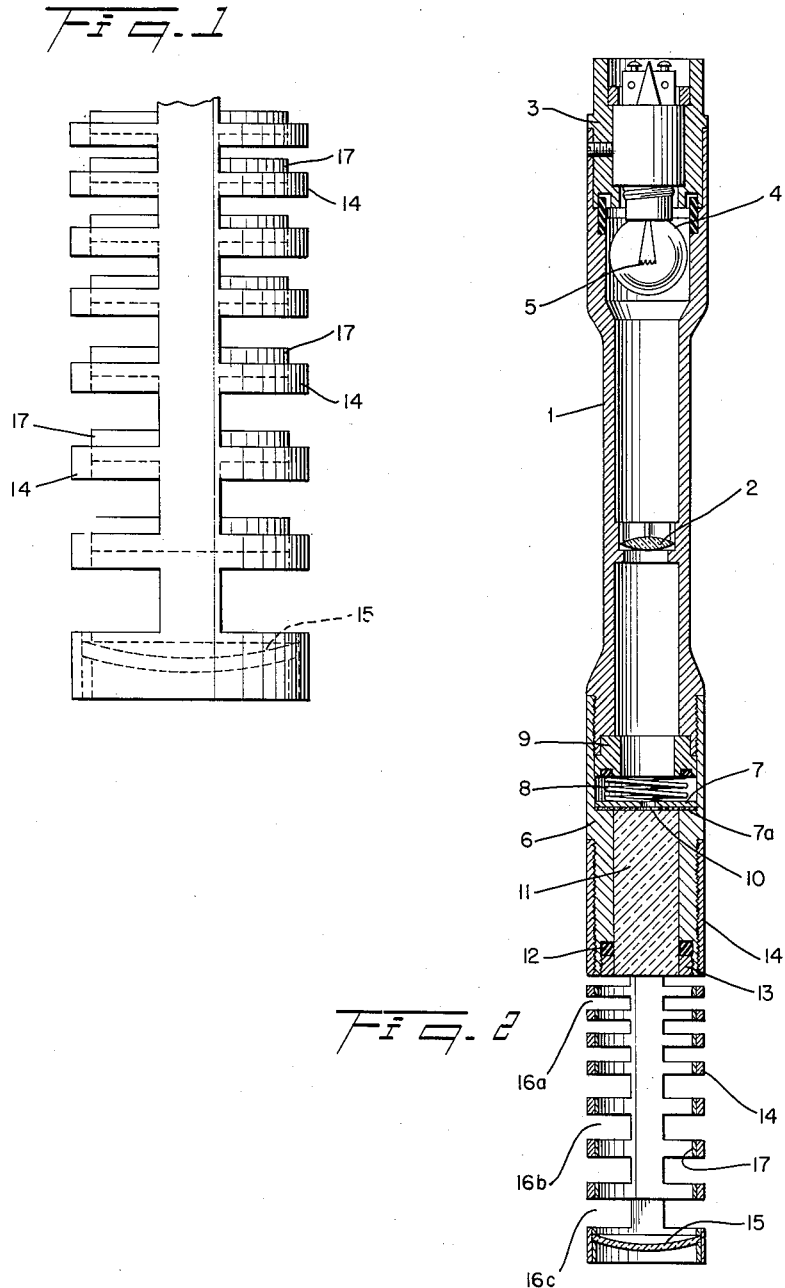
INVENTOR.
CONSTANT GEORGES WIPPLER
BY
*Bauer and Seymour*
ATTORNEYS

United States Patent Office 2,964,640
Patented Dec. 13, 1960

2,964,640

TURBIDIMETER

Constant Georges Wippler, Epinay-sur-Orge, France, assignor to Compagnie de Saint-Gobain, Paris, France Filed Apr. 24, 1958, Ser. No. 730,561

Claims priority, application France May 31, 1957

11 Claims. (Cl. 250—218)

This invention relates to a turbidimeter, for determining the degree of turbidity or the opacity of various fluid media such as liquids and gases.

The invention has among its objects the provision of a novel improved turbidimeter.

Another object of the invention is the provision of a simplified, portable unitary turbidimeter of the photoelectric type.

Still another object of the invention is the provision of a turbidimeter which is compact, rugged, simple in construction, easy to install, and easy to clean.

Yet another object of the invention is the provision of a novel method of turbidimetry.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a fragmentary view in side elevation of the lower, material-receiving end of an illustrative embodiment of turbidimeter made in accordance with the invention, the medium-admitting apertures in the lower end of the housing of the instrument being shown partially closed; and Fig. 2 is a view taken generally in vertical axial section through the illustrative turbidimeter, the medium-admitting apertures being shown in fully opened position.

Prior turbidimeters generally comprise a source of light and a photoelectric cell between which there is positioned a transparent tank or container containing the medium to be observed. Such prior turbidimeters are relatively cumbersome, and require the introduction of the medium into the tank, which is often inconvenient. This is especially true when it is desirable to be able to follow changes in turbidity in a medium in a container in production apparatus, for example, in the continuous precipitation of a polymer from a solution. This is difficult when such container has complex accessories such as means for heating or cooling the container and its contents, agitators, means for adding reagents, etc.

The turbidimeter of the invention overcomes the above outlined difficulties attendant upon prior turbidimeters, and permits the making of turbidity measurements which are rapid and accurate. Such measurements may be made intermittently or continuously, in gaseous or liquid media, and the apparatus of the invention is such that the turbidity measurements may be made in the environment of the medium to be observed, as in confined laboratory containers or receptacles.

In accordance with the invention, the light rays from a light source pass once through the medium to be observed, are reflected by a mirror, and again pass through the medium before they are intercepted and detected. Because the light rays traverse the medium twice before they are intercepted and detected, the effect of the turbidity of the medium upon the means for detecting the light rays is doubled. This increases the sensitivity of the apparatus considerably.

The apparatus of the invention is preferably made as a compact portable unit having one end provided with a medium-receiving chamber. The turbidimeter need merely be introduced into the medium to be observed so that such medium flows into the chamber. Thus no special medium-receiving tanks or containers are necessary and a process being observed need not be disturbed.

Turning now to the illustrative embodiment of turbidimeter shown in the drawing, such apparatus has a hollow tubular body 1, made for example of metal. A lens 2 is located intermediate the length of body 1, and is held centrally therein. The upper end of body 1 is closed by a tubular casing 3 supporting an electric light bulb 4 the filament 5 of which provides a source of visible light. To the lower end of body 1 there is fixedly secured a head 6 containing a photoelectric cell 7, 7a. Such cell is held in place by a coil compression spring 8 and an internal insert ring member 9. As shown, the rim of the photo-electric cell 7, 7a rests upon an internal shoulder in head 6, and spring 8 acts between the lower end of ring 9. Head 6 may be secured to the lower end of body 1 as by a threaded connection between them. Preferably such parts are connected so as to be substantially sealed together.

The photoelectric cell 7, 7a has a light impervious diaphragm member 7, and a layer 7a of photosensitive material on the lower face of the diaphragm 7. The diaphragm is provided with a central aperture 10. The power of lens 2 and the position of photoelectric cell 7, 7a are such that the image of the source 5 is located in the plane of photosensitive layer 7a of the photoelectric cell.

Below the photoelectric cell the head 6 is sealed by a transparent impermeable member such as a plate or block of glass. In the illustrative apparatus such member is a cylindrical glass member 11. A seal between member 11 and the head 6 is effected by an annular packing member 12 which is mounted in a seat in head 6 and held under compression against member 11 by a retainer ring 13 threaded into the lower end of head 6.

The apparatus has a cylindrical extension 14 at its lower end. Member 14 is attached to head 6 as by the illustrative threaded connection between them. At its lower end member 14 carries a transversely disposed concave mirror 15 the concave reflective face of which is directed toward the photoelectric cell. The curvature of mirror 15 is such that the light rays, upon passing through aperture 10 in diaphragm 7 and impinging upon the mirror are reflected by the mirror as a beam of substantially parallel rays.

The member 14 has a plurality of apertures such as 16a, 16b, 16c, etc. through its sidewall; preferably, as shown, such apertures are in the form of rectangular windows. The windows allow the medium being observed to flow into the observation chamber formed by member 14 below glass block 11 and above mirror 15.

Since the apertures allow external light to pass therethrough, there is the danger of decreasing the sensitivity of the apparatus in making turbidity measurements. To overcome this, the apparatus is so designed as to diminish as much as possible the passage of external light into the chamber. In the illustrative apparatus the windows in member 14 which are near the photoelectric cell are narrower than those which are at the bottom of the apparatus and thus further from such cell.

Further, the apparatus is provided with means to adjust the area of the windows through the wall of the observation chamber. Such means are made up of a tube 17 which has apertures in the wall thereof which are the same or substantially the same as those in member 14. Tube 17 is telescoped within member 14 and has frictional engagement therewith. When tube 17 is displaced relative to member 14, as for example longitudinally as shown in Fig. 1, the operator can easily mask more or less of the aperture area, as desired, depending upon the external light level and the opacity or turbidity of the medium being observed. It will be understood that tube 17 may alternatively be displaced angularly relative to member 14, or both angularly and longitudinally, to achieve the desired cutting down of the amount of external light reaching the interior of the observation chamber.

The apparatus functions as follows:

The member 14 is immersed in the medium being observed, so that the observation chamber in such member is filled with the medium. Light emitted by light source 5 passes through aperture 10 in the photoelectric cell 7, 7a, through glass block 11, and through the medium in the observation chamber to mirror 15. The incident light is reflected by mirror 15 in the form of a beam of parallel light rays, such beam passing through the medium in the observation chamber, through glass block 11, and is intercepted by the photosensitive coating 7a of the photoelectric cell.

The quantity of light received by the photoelectric cell depends upon the turbidity of the medium in the observation chamber of the apparatus. The current emitted by the photoelectric cell is thus a measure of the turbidity of the medium.

Preferably, although not necessarily, the measurement of turbidity of a medium is made by comparison with the output of a second, identical photoelectric cell. As an example, there can be employed a second photoelectric cell illuminated by a second light source identical with the first light source, there being a variable opacity compensator system interposed between the second light source and the second photoelectric cell. Such compensator system may be, for example, an optical wedge adjusted by micrometer means. The output circuits of the two photoelectric cells are connected through a galvanometer or the like so that the currents from the two thus lower end thereof, a generally transverse mirror supported currents may be compared, and by suitable adjustment of the optical compensator for the second cell, may be made equal.

The turbidity of a medium being observed may thus be measured. When such turbidity varies, its changes may be followed in a continuous manner by constantly reestablishing the equality of the opposing currents of the two cells by the linear displacement of the optical compensator for the second cell.

The apparatus of the invention may be employed to advantage in observing the precipitation of a high polymer from solution. The member 14 of the apparatus is immersed in the solution, the precipitating agent is added bit by bit, and the resulting turbidity of the solution is observed by use of the apparatus of the invention in the manner above described.

Although only one embodiment of the invention has been illustrated in the accompanying drawings and described in the foregoing specification, it is to be expressly understood that various changes, such as in the relative dimension of the parts, materials used, and the like, as well as the suggested manner of use of the apparatus of the invention may be made therein with-out departing from the spirit and scope of the invention as will now be apparent to those skilled in the art.

What is claimed is:

1. A turbidimeter comprising a mirror adapted to be positioned in a medium to be observed, means to direct an incident beam of luminous rays through a portion of the medium onto the mirror along a path coaxial of the mirror, the mirror reflecting the incident beam to produce the reflected beam coaxial of the incident beam, and means to intercept and detect the rays reflected by the mirror after they have passed through a portion of the medium.

2. A turbidimeter as defined in claim 1, comprising a source of light, and a supporting frame mounting the source of light, the mirror, and the means to intercept and detect the reflected rays so that they are parts of a unitary structure.

3. A turbidimeter as defined in claim 2, wherein the supporting frame is an outer tube, the source of light is disposed in the upper end of the tube, the mirror is supported on the lower end of the tube, the means to intercept and detect the reflected rays is located intermediate the ends of the tube, and comprising means to admit the medium to be observed into a chamber in the tube above the mirror.

4. A turbidimeter as defined in claim 3, wherein the means to intercept and detect the reflected rays comprises a photoelectric cell supported in the tube below the light source and protected from the direct rays from the light source.

5. A turbidimeter as defined in claim 4, comprising means to seal the photoelectric cell against the admission thereto of the medium being observed in the chamber in the lower end of the tube.

6. A turbidimeter as defined in claim 3, wherein the means to admit the medium to the said chamber comprises openings through the wall of the tube whereby the medium may flow into the chamber.

7. A turbidimeter as defined in claim 6, wherein the openings in the wall of the tube are in the form of a series of axially spaced rectangular windows, the windows nearer the means to intercept and detect the reflected rays being spaced closer together than the windows adjacent the lower end of the tube.

8. A turbidimeter as defined in claim 6, comprising means whereby the amount of external light passing through said openings may be diminished.

9. A turbidimeter as defined in claim 8, comprising an inner tube telescoped within the outer tube at the lower end of the latter, the inner tube having a series of axially spaced windows generally similar to the windows in the outer tube, the two tubes being relatively displaceable to vary the effective size of the apertures communicating with the chamber.

10. A turbidimeter comprising a tube, a source of light in the upper part of the tube directing an incident beam of light rays generally axially of the tube toward the lower end thereof, a generally transverse mirror supported at the lower end of the tube, the mirror reflecting the incident beam to produce the reflected beam coaxial of the incident beam and directed toward the upper part of the tube, a light impermeable diaphragm disposed across the tube below the light source, a central opening through the diaphragm for passing the incident beam downwardly therethrough, a photoelectric cell for receiving the reflected beam, such photoelectric cell comprising a layer of photosensitive material disposed below the diaphragm and around the opening therein so as to be shielded from the direct rays from the light source, a chamber in the lower end of the tube above the mirror for receiving a medium to be observed, means to admit said medium to the chamber, and transparent means below the photoelectric cell forming the upper end of the chamber and sealing the cell from said medium.

11. A turbidimeter as defined in claim 10, wherein said transparent means is a piece of glass in contact with the layer of photosensitive material.

References Cited in the file of this patent

UNITED STATES PATENTS

| | | |
|---|---|---|
| 1,828,894 | Freygang | Oct. 27, 1931 |
| 2,562,181 | Frommer | July 31, 1951 |
| 2,580,500 | Albert | Jan. 1, 1952 |
| 2,673,297 | Miller | Mar. 23, 1954 |
| 2,892,378 | Canada | June 30, 1959 |

FOREIGN PATENTS

| | | |
|---|---|---|
| 479,662 | Great Britain | Feb. 9, 1938 |
| 966,498 | France | Mar. 8, 1950 |